Oct. 28, 1924.

E. P. THURBAN 1,513,198

TYPEWRITER SPACE GAUGE

Filed April 30, 1924

Inventor
E. P. Thurban
By Clarence A. O'Brien
Attorney

Patented Oct. 28, 1924.

1,513,198

UNITED STATES PATENT OFFICE.

EDWARD P. THURBAN, OF HABANA, CUBA.

TYPEWRITER SPACE GAUGE.

Application filed April 30, 1924. Serial No. 710,170.

*To all whom it may concern:*

Be it known that I, EDWARD P. THURBAN, a citizen of the United States, residing at Habana, in the Province of Habana and Island of Cuba, have invented certain new and useful Improvements in Typewriter Space Gauges, of which the following is a specification.

This invention relates to a line gauge adapted to be applied to a typewriting machine, and may consist in the novel features hereinafter described and claimed.

An object of the invention is to provide a gauge of the character stated, and in the form of an attachment, which may be applied to any standard make of typewriter machine, and when so applied will indicate the number of line spaces, which have been made or turned upon the sheet of paper, which is applied to the typewriting machine, and which will also indicate the number of line spaces remaining upon the said sheet of paper, and which may be brought into register with the type path as the platen roller of the machine is turned. The gauge includes a casing adapted to be applied to the frame of a typewriter machine, and having at its obverse side a pair of sight openings. A shaft is journalled in the casing, and is provided with means whereby it may be connected with the end of the platen shaft of the typewriting machine.

Stub shafts are journalled in the casing and carry discs having their periphery normally positioned at the sight opening in the casing. Gear wheels are mounted upon the stub shafts and are adapted to mesh with the terminal gears of a train of gears, which operatively connect the stub shafts with the first mentioned shafts. The discs are provided upon their peripheries with series of numbers, and the stub shaft may be moved longitudinally, whereby the gear wheels which are carried by the stub shafts may be moved out of mesh with the terminal gear of said train of gears, and when it is desired to adjust the stub shafts and the disc with relation to the shaft of the platen of the typewriting machine.

Figure 1:
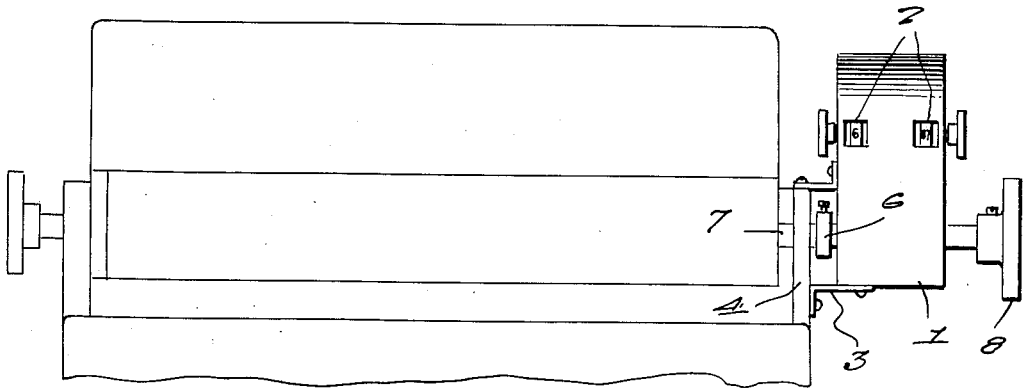
Figure 1 is a side elevation of the space gauge, showing the same applied to the frame of a typewriting machine.
Figure 2:
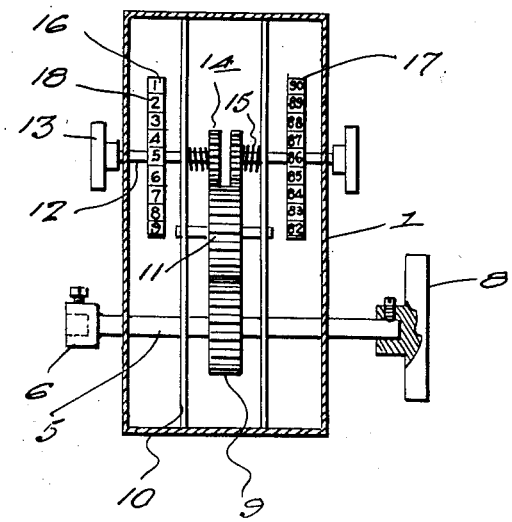
Figure 2 is a transverse sectional view of the space gauge.
Figure 3:
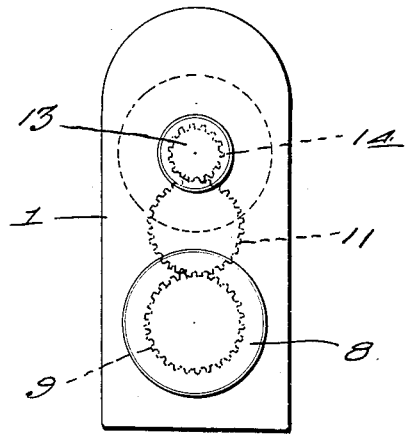
Figure 3 is a side elevation of the space gauge, viewing the same at a right angle to the side thereof shown in Figure 1.

The typewriter space gauge comprises a casing 1, which is provided at its obverse side with a pair of sight openings 2. Brackets 3 are applied to the casing 1, and may be attached to the frame 4 of a typewriting machine in any suitable manner. A shaft 5 is journalled transversely in the casing 1, and the ends of the said shaft project beyond the side walls of the said casing. The shaft 5 is provided at one end with a socket head 6, adapted to receive the ends of the platen shaft 7 of the typewriting machine. At its opposite end, the shaft 5 carries a turning knob 8. The gear wheel 9 is mounted upon the portion of the shaft 5 and is disposed between strips 10 located within the casing 1 and spaced from the side walls thereof as best shown in Figure 2 of the drawing. A gear wheel 11 is journaled in the casing 1 and meshes with the gear wheel 9. The axis of the gear wheel 11 is journaled in the strip 10 hereinbefore mentioned. Stub shafts 12 are journalled in the casing 1, and have end portions which extend beyond the side walls of the said casing and which carry turning knobs 13. The inner portions of the stub shafts 12 are journalled in the strips 10. The stub shafts 12 are movable longitudinally in their bearings. At their inner ends the stub shafts 12 carry gear wheels 14, which normally mesh with the teeth of the gear wheels 11. Springs 15 are normally interposed between the inner surfaces of the strip 10 and the adjacent surfaces of the gear wheels 14 and are under tension with a tendency to hold the gear wheels 14 toward each other and in mesh with the teeth of the gear wheels 11 as shown in Figure 2. A disc 16 is mounted upon one of the stub shafts 12 and is located between one of the side walls of the casing 1, and the adjacent strip 10. The disc 17 is mounted upon the intermediate portion of the other stub shaft 12, and is located between one of the side walls of the casing 1 and the adjacent strip 10. Peripheries of the discs 16 and 17 are normally visible through the sight opening 2. The peripheries of the discs 16 and 17 are provided with series of numbers 18. The series of numbers upon the disc 16 has the numbers increasing in order of magnitude around the disc, in one direction, and the numbers of the series of numbers on disc 17 decrease in the opposite direction around the disc.

The numbers upon the disc 16 are preferably colored black, and the numbers upon the discs 17 are preferably colored red. However, these sets of numbers may have any other distinctive colors.

The numbers upon the disc 16 as they are brought opposite the sight openings in the casing 1 provided for the said disc indicates the number of line spaces which have been used upon the sheet of paper which is applied to the typewriting machine. The number upon the disc 17 which appear opposite the sight opening in the casing 1, provided for the disc indicates the number of line spaces remaining upon the said sheet of paper, and at the lower portion thereof, and therefore as the platen shaft is turned, the numbers upon the disc 16 which appear through the sight openings in the casing 1, increase in magnitude and the numbers upon the disc 17, which appear at the sight openings in the casing 1, decrease in magnitude. When the sheet of paper is started into the typewriting machine and the writing is begun thereon, the stub shafts 12 are moved longitudinally whereby the gear wheels 14 are moved out of mesh with the teeth of the gear wheel 11, and the stub shaft 12 which carries the disc 16 is turned, so that the initial number of the series of numbers thereon is brought opposite the opening in the casing 1, and this initial number indicates that the first line upon the sheet of paper and which is to be written on by the type is in register with the path of movement of the type. When the shaft 12 is released, the spring 15 mounted upon the said shaft moves the wheel 14 into mesh with the teeth of the wheel 11. The stub shaft 12 which carries the disc 17 is then adjusted so that the number in the series of numbers upon the disc which represents the complete number of line spaces which may be written upon the particular sheet of paper is brought opposite the sight opening 2 in the casing 1, and then the shaft 12 is moved, whereby the gear wheel 14 is brought into mesh with the teeth of the gear wheel 11. Thus, the parts of the gauge are adjusted, and as the lines are written on the sheet of paper and the platen shaft is turned, the disc at one side of the casing will indicate the number of lines which have been written upon the sheet of paper and the disc at the opposite side of the casing will indicate the number of blank lines, which remain upon the sheet of paper and upon which writing may be inscribed.

Having described the invention, what is claimed is:

1. A line space gauge for a typewriting machine comprising a casing adapted to be applied to the frame of the machine, a shaft journalled in the casing and having means for connection with the platen shaft of the machine, the casing being provided at its side with a pair of sight openings, stub shafts journalled in the casing and adapted to move longitudinally therein, gear wheels operatively connecting the stub shafts respectively with the first mentioned shafts, spring means for maintaining the gear wheels in mesh with each other, and discs carried by the stub shafts and having their peripheries disposed opposite the sight openings in the casing, the peripheries of the discs being provided with a series of numbers.

2. A line space gauge adapted to be used upon typewriter machines comprising a casing having at its sides a pair of sight openings and adapted to be applied to the frame of the machine, a stub shaft journalled in the casing and adapted to be connected with the platen shaft of the machine, a gear wheel mounted upon said shaft, stub shafts journalled in the casing above the first mentioned shaft and adapted to move longitudinally in their bearings, gear wheels carried at the inner ends of the stub shafts, a gear wheel journalled in the casing and interposed between the first mentioned gear wheel and the gear wheels upon the stub shafts, spring means located within the casing and adapted to hold the teeth of the gear wheels upon the stub shafts in mesh with the teeth upon the second mentioned gear wheel, discs carried by the stub shafts and disposed opposite the sight openings in the casing, said discs being provided upon their peripheries with series of numbers, the numbers of the series of numbers upon one disc increasing in magnitude in one direction around the disc and the numbers of the series of numbers of the other disc decreasing in magnitude in the same direction around the said disc.

In testimony whereof I affix my signature.

EDWARD P. THURBAN,